United States Patent [19]

Crepy et al.

[11] Patent Number: 5,188,913
[45] Date of Patent: Feb. 23, 1993

[54] LITHIUM/BROMINE TRIFLUORIDE ELECTROCHEMICAL CELL DESIGNED TO BE DISCHARGED AFTER BEING ACTIVATED AND STORED

[75] Inventors: Gilles Crepy, Evry; Jean-Pierre Buchel, Lisses, both of France

[73] Assignee: Alcatel Alsthom Compagnie Generale D'Electricite, Paris, France

[21] Appl. No.: 857,490

[22] Filed: Mar. 25, 1992

[30] Foreign Application Priority Data

Mar. 26, 1991 [FR] France .................. 91 03646

[51] Int. Cl.$^5$ .................. H01M 4/36; H01M 6/14
[52] U.S. Cl. .................. 429/101; 429/198; 429/199
[58] Field of Search .............. 429/196, 198, 199, 101, 429/105

[56] References Cited

U.S. PATENT DOCUMENTS

| | | |
|---|---|---|
| 3,427,207 | 2/1969 | Toy et al. |
| 4,107,401 | 8/1978 | Goodson et al. ......... 429/101 |
| 4,246,327 | 1/1981 | Skarstad et al. ......... 429/105 |

FOREIGN PATENT DOCUMENTS

2056752  3/1981  United Kingdom .

OTHER PUBLICATIONS

Report, WGL-MLR-90-07, Order No. AD-A225508, P32 1990, Frysz, C. A. et al., Wilson Greatbatch Ltd.: 'Feasibility of a Super High Energy Density Battery of the Li/BrF$_3$ Electrochemnical System'.

Extended Abstracts (US) Electrochemical Society, vol. 88/2, No. 30, Princeton, N.J. US, pp. 42–43.

K. H. Park et al.: 'A Comparison of Lithium Magnesium and Calcium Anodes in Bromine Trifluoride'.

Patent Abstracts of Japan, vol. 13, No. 561 (E-859)(3909) Dec. 13, 1989 and JP-A-1 232 661 (Sanyo Electric Co. Ltd.).

Primary Examiner—John S. Maples
Attorney, Agent, or Firm—Sughrue, Mion, Zinn, Macpeak & Seas

[57] ABSTRACT

A lithium and bromine trifluoride electrochemical cell designed to be discharged after being activated and stored, the cell comprising an anode made of lithium or lithium alloy and a positive current collector made of carbon black, and containing at least one compound that is soluble in bromide trifluoride, and is capable of stabilizing the passivation layer of said anode and of blocking corrosion of said anode during storage, the compound being selected from sulfonates and being at a concentration lying in the range $10^{-2}$ moles per liter to 1 mole per liter. After the cell of the invention has been stored, it restores a large fraction of its initial capacity (curve C).

2 Claims, 1 Drawing Sheet

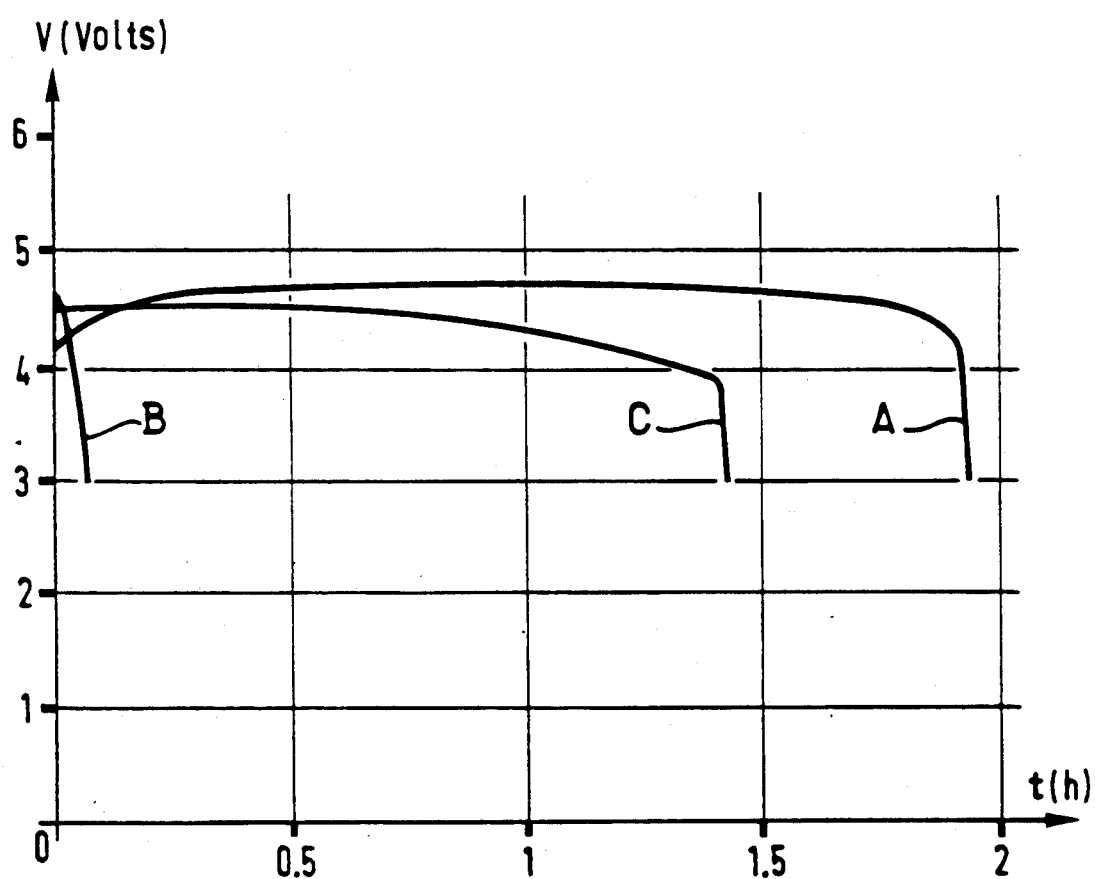

LITHIUM/BROMINE TRIFLUORIDE ELECTROCHEMICAL CELL DESIGNED TO BE DISCHARGED AFTER BEING ACTIVATED AND STORED

The present invention relates to a lithium/bromine trifluoride electrochemical cell designed to be discharged after it has been activated and stored. In a wide variety of applications, there exists a permanent demand for energy sources of ever increasing performance, providing greater energy than primary cells having liquid cathodes of the thionyl chloride type.

BACKGROUND OF THE INVENTION

Potentially the most advantageous electrochemical couple is the lithium-fluorine couple whose theoretical potential is about 5.9 volts with a theoretical energy density of greater than 5000 Wh/kg. Nevertheless, it is difficult to envisage using fluorine directly because of severe difficulties in handling it. Fluorine is a gas at ambient temperature and under atmospheric pressure and it is extremely reactive.

In contrast, it is possible to envisage using fluorine associated with some other element, thereby obtaining compounds that are more easily handled at a temperature close to ambient temperature. This applies when fluorine is associated with a halogen such as bromine, thereby obtaining a liquid compound such as bromine trifluoride, which liquid can be used as a catholyte in liquid cathode lithium primary cells.

It is observed that lithium and certain aklaline-earth metals are passivated in bromine trifluoride. The excessive passivation of the metals is even somewhat of a limitation on the system. This causes the anode of a lithium and bromine trifluoride cell that has been activated and stored for a few hours in open circuit to cease discharging.

An object of the present invention is to avoid this drawback and to enable a large fraction of the energy of the cell to be recovered even if it has been stored for several tens of hours after being activated.

SUMMARY OF THE INVENTION

The present invention provides a lithium and bromine trifluoride electrochemical cell designed to be discharged after being activated and stored, the cell comprising an anode made of lithium or lithium alloy and a positive current collector made of carbon black, and containing at least one compound that is soluble in bromine trifluoride, and is capable of stabilizing the passivation layer of said anode and of blocking corrosion of said anode during storage, the compound being selected from sulfonates and being at a concentration lying in the range $10^{-2}$ moles per liter to 1 mole per liter.

Preferably lithium trifluoromethane sulfonate is used.

The compound of the invention changes the ionic properties of the film that passivates the anode, prevents its growing, and enables the cell to be stored, and after storage to restore 70% of the capacity that could have been discharged therefrom immediately after activation. Corrosion of the lithium is thus limited, and in addition the following are made possible:

an increase in the conductivity of pure bromine trifluoride;

a decrease in the melting point of pure bromine trifluoride (8.8° C.); and the fluorides can be complexed and the solubility of reaction products such a LiF and $LiBrF_4$ is increased.

BRIEF DESCRIPTION OF THE DRAWING

Other characteristics and advantages of the present invention appear from the following description of an embodiment given by way of non-limiting illustration. In the accompanying drawing, the sole FIGURE is a graph showing discharge curves for cells of the prior art and of the invention: potential V (in volts) being plotted as a function of time t (in hours).

DETAILED DESCRIPTION

Two prior art electrochemical cells were made comprising:

a lithium anode;

a catholyte containing bromine trifluoride, only; and a cathode collector made of porous carbon.

The first cell A was activated and discharged immediately at 10 $mA/cm^2$. Curve A illustrates the discharge.

The second cell B was activated, stored overnight, and discharged under the same conditions as the first cell. Its discharge is illustrated by curve B. The discharge yield of the passivated lithium anode constitutes only 1% of the theoretical capacity of the lithium.

A cell C of the invention was also made. It was analogous to the above two cells, but 0.1 moles per liter of lithium trifluroromethane sulfonate $LiCF_3SO_3$ was added to the bromine trifluoride. This cell was stored after activation and then discharged under the same conditions as the cell B. Curve C was obtained. Cell C restored 70% of the capacity restored by cell A, at an average potential of 4.5 volts. This represents an increase in potential of about 50% compared with the present $Li/SOCl_2$ system.

Naturally the embodiment described above is given purely by way of example.

The cell may be stored for a period of time of up to a few weeks.

The concentration of the added compound may go up to 1 mole per liter.

We claim:

1. A lithium and bromine trifluoride electrochemical cell designed to be discharged after being activated and stored, the cell comprising an anode made of lithium or a lithium alloy, a positive current collector made of carbon black and a catholyte comprising bromine trifluoride as a main component, said catholyte further containing at least one compound that is soluble in bromine trifluoride in a concentration of from $10^{-2}$ to 1 mole per liter selected from the group consisting of sulfonates, and said sulfonate is capable of stabilizing the passivation layer of the anode and of blocking corrosion of the anode during storage.

2. A lithium and bromine trifluoride electrochemical cell according to claim 1, wherein said sulfonate is lithium trifluoromethane sulfonate.